No. 774,600. PATENTED NOV. 8, 1904.
W. T. NICHOLLS.
POT FURNACE FOR MELTING GLASS.
APPLICATION FILED APR. 2, 1903.
NO MODEL. 3 SHEETS—SHEET 1.

WITNESSES
INVENTOR
W. T. Nicholls
by Bakewell & Byrnes
his attys

No. 774,600. PATENTED NOV. 8, 1904.
W. T. NICHOLLS.
POT FURNACE FOR MELTING GLASS.
APPLICATION FILED APR. 2, 1903.
NO MODEL. 3 SHEETS—SHEET 2.

WITNESSES
INVENTOR

No. 774,600. PATENTED NOV. 8, 1904.
W. T. NICHOLLS.
POT FURNACE FOR MELTING GLASS.
APPLICATION FILED APR. 2, 1903.
NO MODEL. 3 SHEETS—SHEET 3.
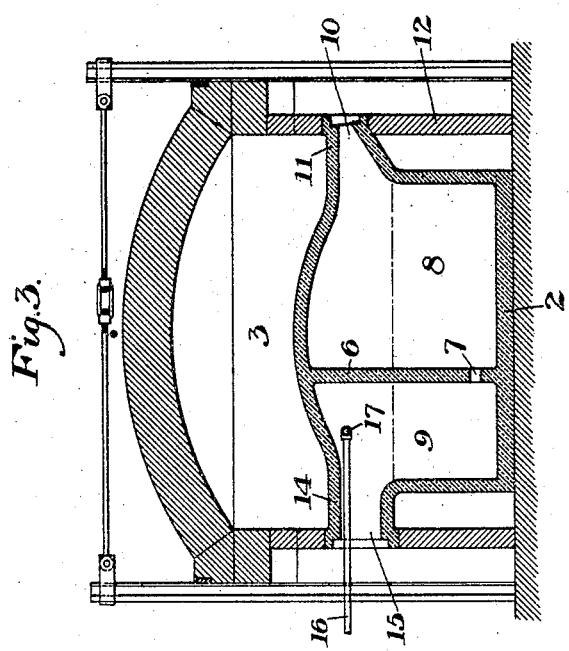

No. 774,600.

Patented November 8, 1904.

UNITED STATES PATENT OFFICE.

WILLIAM T. NICHOLLS, OF WELLSBURG, WEST VIRGINIA.

POT-FURNACE FOR MELTING GLASS.

SPECIFICATION forming part of Letters Patent No. 774,600, dated November 8, 1904.

Application filed April 2, 1903. Serial No. 150,779. (No model.)

*To all whom it may concern:*

Be it known that I, WILLIAM T. NICHOLLS, of Wellsburg, in the county of Brooke and State of West Virginia, have invented a new and useful Pot-Furnace for Melting Glass, of which the following is a full, clear, and exact description, reference being had to the accompanying drawings, forming part of this specification, in which—

Figure 1:
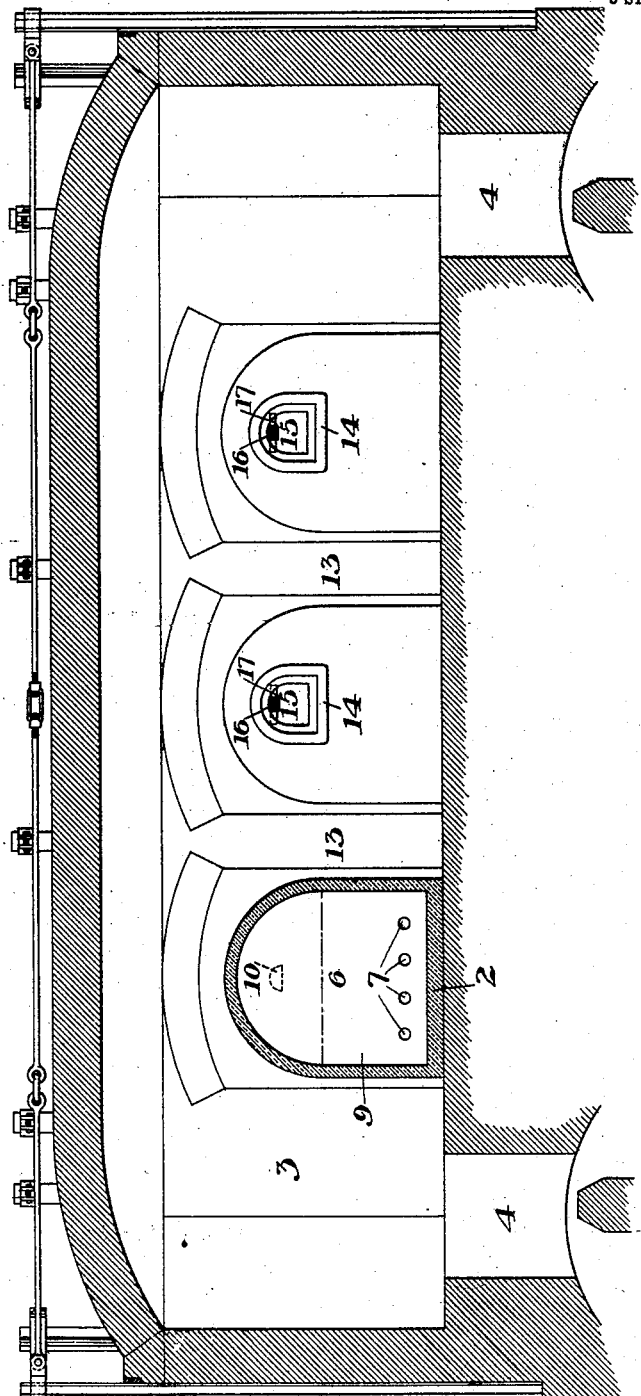
Figure 2:
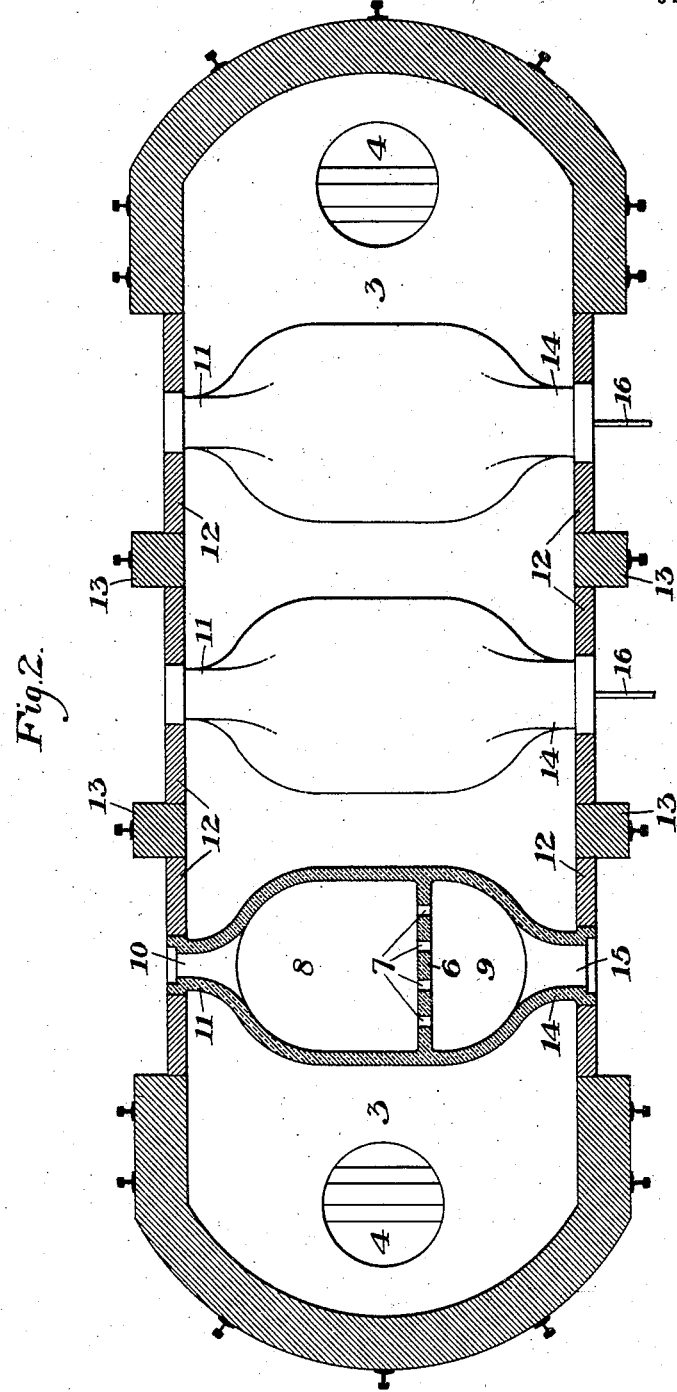

Figure 1 is a sectional side elevation showing a pot-furnace constructed in accordance with my invention. Fig. 2 is a horizontal longitudinal section of the same, part of the pots being shown in top plan view; and Fig. 3 is a vertical cross-section through the furnace and one of the pots.

My invention relates to the melting of glass in pots wherein the batch is out of contact with the heating-flame and gases and is designed to provide an improved pot and furnace by which glass may be melted continuously and taken as desired from one end of the pot.

In the drawings I show the pot as having a flat bottom 2, which rests on the bench or floor of the heating-furnace 3, which is of the regenerative type, with the regenerative flues 4 4 leading upwardly into the furnace at opposite ends. The pot is provided with a vertical transverse partition 6, having slots or holes 7 in its lower portion and which connect the melting-compartment 8 with the work-out compartment 9. The pot is provided with a feed-opening 10 at one end, formed in the nose portion 11, which projects through the built-up wall 12 between the supporting-piers 13 of the side walls. The work-out chamber 9 is provided with a similar nose portion 14, having a mouth or outlet 15, through which the glass may be taken out by gathering or in any other desirable manner. This nose projects through the opposite side wall of the furnace-chamber. The melting-chamber is preferably larger than the working-out chamber, the partition being placed at one side of the center, and the glass is preferably kept at about the level indicated by the dotted lines in Figs. 1 and 3. I have shown three of these pots set parallel with each other and extending transversely of the furnace-chamber, the heating-flame and gases passing in opposite directions over and around the pots as the regenerators are reversed.

In order to cool down the glass in the working-out chambers to the proper temperature, I preferably employ cold-air pipes 16, having jet branches 17, which lead in through the feed-out openings and by which a controllable jet of air may be directed upon the surface of the glass in the working-out chamber.

In using the furnace the batch is fed to the melting-chambers through the openings at the ends of the pots on one side, and as the glass melts it flows through the lower openings into the work-out chambers, where during normal working the batch will rest at substantially the same level as in the melting-chamber. As the glass is taken out from the chambers 9 on the other side of the furnace portions of the batch to be melted are fed into the melting-chambers at any desirable intervals, thus giving a continuous operation in melting and removing. The regenerators are reversed in the usual manner, and the glass in the work-out chambers is controlled in temperature by the cold-air jets or other desirable cooling means.

The advantages of my invention result from the continuous operation. The pots are not filled up and the batch melted and then worked out, after which an entire new and cold batch is filled into the hot empty pot, and hence the pots will be long-lived, as their temperature is kept substantially the same. The delay incident to melting the batch is avoided after the pots are once started. As the glass enters the working chamber through a hole or holes near the bottom of the partition, the impurities will not enter the work-out chamber and a good grade of glass is obtained. As the glass may be kept at the same or any convenient level in the work-out chamber, the difficulty in gathering, as in ordinary pots, when the glass gets low in the pots, is avoided.

Many variations may be made in the form and arrangement of the pots, the furnace, &c., without departing from my invention.

I claim—

1. A pot-furnace comprising a long narrow combustion-chamber of tunnel form, reversing regenerators connected to opposite ends of the said tunnel, and a series of similar transverse pots with closed tops set in the furnace-chamber with their ends opening through the side walls of the tunnel, each pot having a feed-in opening at one side of the chamber and a work-out opening at the opposite side, said chamber being arranged to allow the gases to sweep from one end over the series of pots to the other end; substantially as described.

2. A pot-furnace comprising a long narrow combustion-chamber of tunnel form, reversing regenerators connected to opposite ends of the said tunnel, and a series of similar transverse pots with closed tops set in the furnace-chamber with their ends opening through the side walls of the tunnel, each pot having a feed-in opening at one side of the chamber and a work-out opening at the opposite side and provided with a separating-partition with an opening in its lower portion, said chamber being arranged to allow the gases to sweep from one end over the series of pots to the other end; substantially as described.

3. A pot-furnace having a series of pots therein with closed tops and openings at opposite sides of the furnace, each pot having a transverse partition with a hole in its lower part to allow glass to flow from the melting-chamber to the work-out chamber, and means for cooling the glass in the work-out chamber; substantially as described.

In testimony whereof I have hereunto set my hand.

WILLIAM T. NICHOLLS.

Witnesses:
   GEO. W. McCLEARY,
   T. W. CARMICHAEL.